(12) United States Patent
Tracy

(10) Patent No.: US 7,617,574 B2  
(45) Date of Patent: Nov. 17, 2009

(54) TELESCOPING FASTENER

(75) Inventor: Richard J. Tracy, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 69 days.

(21) Appl. No.: 11/225,594

(22) Filed: Sep. 13, 2005

(65) Prior Publication Data

US 2006/0130289 A1 Jun. 22, 2006

Related U.S. Application Data

(60) Provisional application No. 60/636,600, filed on Dec. 16, 2004.

(51) Int. Cl.
  *F16G 11/04* (2006.01)
  *F16G 11/00* (2006.01)
(52) U.S. Cl. .................... 24/115 G; 24/136 R
(58) Field of Classification Search .......... 24/24, 24/115 G, 580.1, 580.11, 600.5, 600.7, 600.8, 24/712.1, 712.4, 712.7
See application file for complete search history.

(56) References Cited

U.S. PATENT DOCUMENTS

| | | | | |
|---|---|---|---|---|
| 143,332 A | * | 9/1873 | Covert | 24/600.7 |
| 1,223,957 A | * | 4/1917 | Gardner | 24/600.7 |
| 4,453,292 A | * | 6/1984 | Bakker | 24/115 G |
| 4,675,948 A | * | 6/1987 | Bengtsson | 24/115 G |
| 4,724,584 A | * | 2/1988 | Kasai | 24/115 G |
| 4,839,946 A | * | 6/1989 | Murai | 24/115 G |
| 5,263,232 A | * | 11/1993 | Matoba | 24/115 G |
| 5,621,952 A | * | 4/1997 | Frano | 24/115 G |
| 5,671,505 A | * | 9/1997 | Anscher | 24/115 G |
| 5,737,808 A | * | 4/1998 | Ikeda | 24/115 G |
| 6,018,851 A | * | 2/2000 | Anscher | 24/115 G |
| 6,038,746 A | * | 3/2000 | Anscher et al. | 24/115 G |
| 6,276,030 B1 | * | 8/2001 | Smith | 24/115 G |
| 6,339,865 B1 | * | 1/2002 | Takahashi et al. | 24/115 G |
| 6,453,524 B1 | * | 9/2002 | Liu | 24/712.5 |
| 6,510,627 B1 | * | 1/2003 | Liu | 36/50.1 |
| 2005/0268436 A1 | * | 12/2005 | Yoshiguchi | 24/115 G |

\* cited by examiner

*Primary Examiner*—Robert J Sandy
(74) *Attorney, Agent, or Firm*—Mark W. Croll; Paul F. Donovan

(57) ABSTRACT

A telescoping fastener includes a debris clearance and drain port in a housing of the fastener, and a plunger operable in the housing to move contaminants toward the port for removal. A force concentrating tip breaks up snow, ice or accumulated debris. Relief channels in the plunger facilitate movement of contaminants around the plunger and movement of the plunger through contaminants within the housing.

14 Claims, 3 Drawing Sheets

TELESCOPING FASTENER

CROSS-REFERENCE TO RELATED APPLICATIONS

The present regular U.S. patent application claims the benefits of U.S. Provisional Application Ser. No. 60/636,600 filed Dec. 16, 2004.

FIELD OF THE INVENTION

The present invention relates to telescoping fasteners and, more particularly, to telescoping fasteners intended for use in harsh or adverse conditions.

BACKGROUND OF THE INVENTION

Telescoping components are used in fasteners and attachment devices of various types, including cord locks, locking fasteners, key chains, snap hooks or tethers such as dog leashes, etc. The telescoping components slide relative to each other. For simplicity, all such devices will be referred to herein as "telescoping fasteners", whether the device is a fastener, connector, hook or other device.

Telescoping fasteners have achieved widespread use and acceptance. Often, a spring is used either as a separate component or integral with one of the other components to bias the sliding components to a desired, default position. Often, the spring is used to bias the fastener to a closed or locked position. The fastener is operated, usually to open it, by sliding one of the components relative to the other component. Telescoping fasteners incorporating these general features have performed very well for many applications and uses.

As with devices of all types, telescoping fasteners can fail if one or more of the components fail. Wear from age and use can cause such failures; the fastener simply wears out. However, premature failure can occur under certain conditions.

Many telescoping fasteners define a relatively enclosed vessel as the outer housing in which a plunger slides. Water can intrude into the housing, and in sufficiently cold environments the water will freeze. When the entrapped water freezes, it may be impossible or difficult to activate the telescoping components. The expansion of freezing entrapped water may even cause the housing to rupture, or may expel the plunger from the housing. Even in warm temperatures, water can cause failure through rusting deterioration of metal springs used in the telescoping fastener. If water is retained in the fastener for an extended time period, rusty effluent dripping slowly from the fastener can stain the fastener or material near the fastener.

A telescoping fastener also can fail if debris intrusion occurs. Small particulate matter such as dirt, sand and mud lodged between the relative sliding members can cause the plunger component to seize and bind within the housing, rendering the fastener inoperable.

In many consumer uses of telescoping fasteners, failure is merely inconvenient. With a telescoping fastener intended for military or law enforcement "tactical" applications, failure may have a far greater adverse effect, and in certain cases even dire consequences. During military and law enforcement activities, it is common for personnel to be active in very adverse climates and terrains, including freezing, wet, dirty, sandy, dusty and stormy conditions. When deployed in these environments, the potential for failure of the telescoping fastener from water or debris intrusion is accelerated, and the occurrence of intrusion maybe unavoidable.

What is needed is a telescoping fastener that is less prone to failure from water or debris intrusion.

SUMMARY OF THE INVENTION

The present invention provides a telescoping fastener with a housing having a port for debris clearance and liquid draining, and a plunger designed to clear the fastener of debris and ice. Reduced contact area between the housing and plunger minimizes the potential for binding.

In one aspect thereof, the present invention provides a telescoping fastener with a housing defining a vessel and a plunger movable in the vessel. A port is provided in the housing from an interior volume of the vessel to an ambient environment of the vessel. An end of the plunger is configured for moving contaminant material in the vessel toward the port.

In another aspect thereof, the present invention provides a telescoping fastener with a housing defining a debris clearance and liquid drain port and a plunger configured to slide in the housing. The plunger includes a body having an outer surface adjacent the housing. Channels in the outer surface of the body accommodate movement of the plunger through debris in the housing.

In a still further aspect thereof, the present invention provides a telescoping fastener with a housing and a plunger slidable relative to the housing. The plunger and the housing define a substantially enclosed vessel. A debris removal and drain port is disposed in the housing establish flow communication between the vessel and an ambient environment. The plunger includes a debris removal extension configured to move debris toward the port.

An advantage of the present invention is providing a telescoping fastener from which water or other liquids will drain, and which purges debris from the fastener.

Another advantage of the present invention is providing a telescoping fastener that is less prone to failures when used in inclement weather and dirty environments.

Still another object of the present invention is providing a telescoping fastener that breaks up snow and ice that forms in the fastener, as well as clumping debris that may enter the fastener.

Yet another advantage of the present invention is providing a telescoping fastener that is less likely to bind or freeze from debris within the fastener.

Other features and advantages of the invention will become apparent to those skilled in the art upon review of the following detailed description, claims and drawings in which like numerals are used to designate like features.

Figure 1:
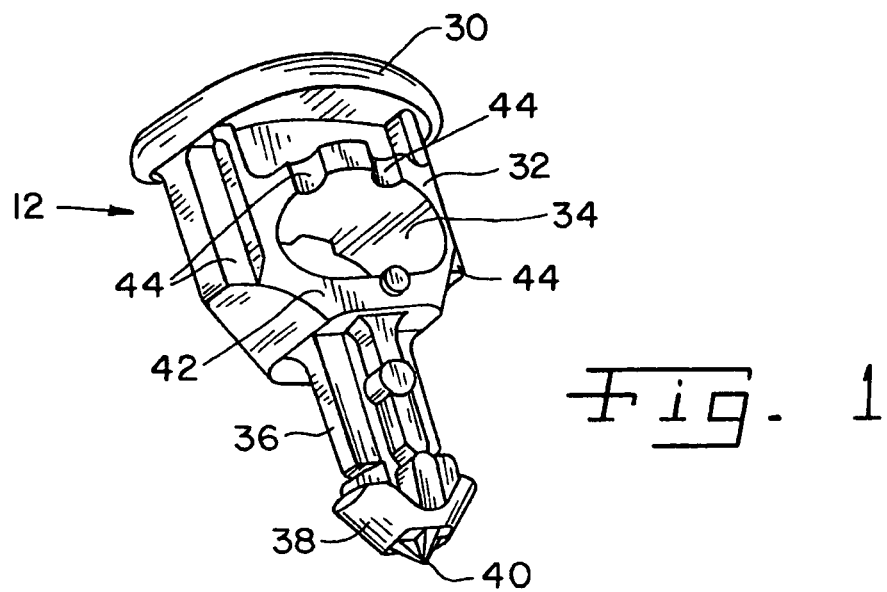
FIG. 1 is a perspective view of a plunger for a fastener of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 6:
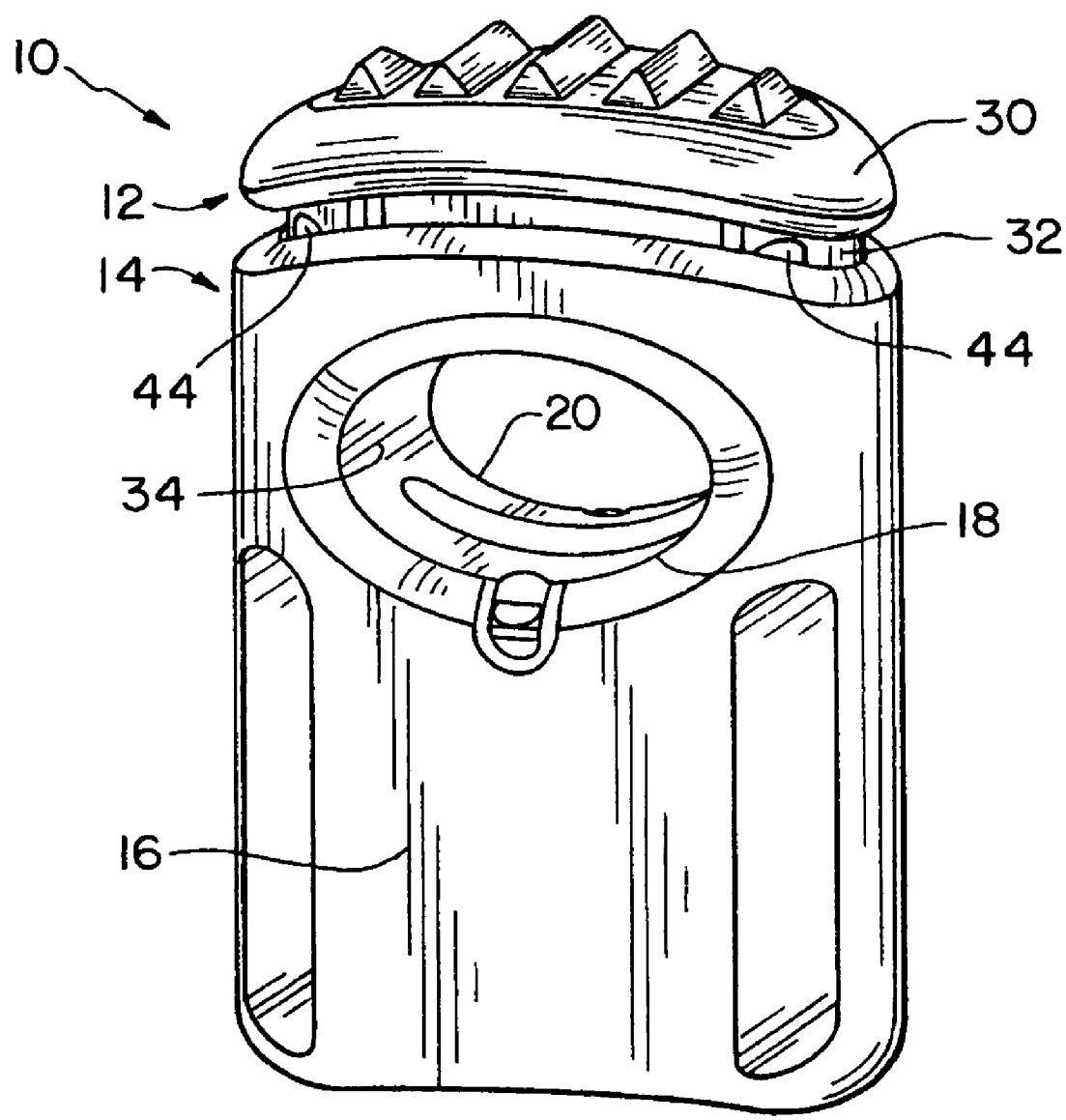
FIG. 6 is a perspective view of a cord lock telescoping fastener similar to that shown in FIGS. 1 and 2.

Referring now more specifically to the drawings, a telescoping fastener in the nature of a cord lock 10 is shown (FIG. 6). Cord lock 10 includes a plunger 12 (FIG. 1) and a housing 14 (FIG. 2). As those skilled in the art will understand readily, the present invention to be described hereinafter can be used in a variety of different types of fastening or hooking devices being referred to commonly herein as a "telescoping fastener". Telescoping fasteners of the present invention can take many different shapes and be useful for many different purposes, including those mentioned in the background section hereof. It is known to make telescoping fasteners of various types from plastic by injection molding processes. Telescoping fasteners incorporating the present invention can also be made of various materials other than plastics, such as various metals, and can readily be manufactured by a variety of known forming techniques for such other materials, including molding or casting.

Housing 14 is a structure having a substantially closed vessel area 16 configured for slidingly receiving an inner portion of plunger 12 and a spring (not shown) for biasing plunger 12 relative to housing 14. In the exemplary embodiment, housing 14 further defines eyelets 18 and 20 on opposite sides thereof through which a cord, rope, strap or the like (not shown) can be extended. Vessel area 16 is substantially closed when plunger 12 is positioned therein, and housing 14 together with plunger 12 forms a substantially closed area from which liquid would not drain easily. To allow drainage, in the bottom of vessel area 16, housing 14 defines a debris clearance and liquid drain port 22. Port 22 extends from an interior volume of vessel area 16 to the ambient environment of vessel area 16. Accordingly, water or other fluids accumulating in vessel area 16 can drain therefrom through port 22, and debris including dirt, sand, snow and ice has an outlet through which it can be expelled from vessel area 16. While a single debris clearance and liquid drain port 22 is shown in the exemplary embodiment, it should be understood that a plurality of ports can be provided at various locations to facilitate efficient removal of liquids and debris from housing 14.

Plunger 12 has a top 30 and a body 32 slidably received in housing 14. An aperture 34 defined through body 32 can be aligned with eyelets 18 and 20 for sliding a cord, rope or the like through eyelets 18 and 20 and aperture 34. The spring (not shown) biases plunger 12 to a position in which aperture 34 is slightly misaligned with eyelets 18 and 20, thereby binding the rope, cord or the like extending therethrough. In this regard, as thus far described, plunger 12 is of common design, known to those skilled in the art.

Figure 2:
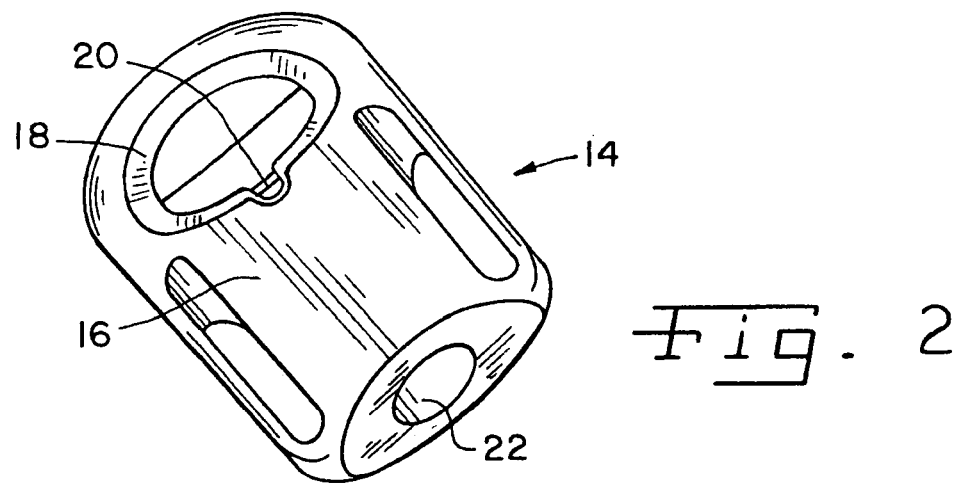
FIG. 2 is a perspective view of the housing for the fastener having the plunger shown in FIG. 1.

In the embodiment of the invention shown in FIG. 1, a debris removal extension 36 projects from body 32 toward debris clearance and liquid drain port 22 when plunger 12 is mounted in housing 14. An end 38 of extension 36 is designed to move debris and fluids toward debris clearance and liquid drain port 22. End 38 can physically push debris or pump fluids toward debris clearance and liquid drain port 22. A force concentrating tip 40 is provided on end 38 to concentrate force applied to plunger 12 to a small area at the end of tip 40. Force concentrating tip 40 therefore can concentrate force for the breakup of snow, ice or agglomerated debris in vessel 16, thereby facilitating transport of the snow, ice or debris through debris clearance and liquid drain port 22. Breaking accumulated debris, ice or snow also enables plunger 12 to pass through the accumulation more easily and with less force being applied, even if the accumulation is not readily expelled through port 22.

In the exemplary embodiment shown in FIG. 1, force concentrating tip 40 is shown as a substantially round point 40 at the end of a generally conical body at the distal end of end 38. However, it should be understood that force concentrating tip 40 can be provided in other configurations, such as a thin, relatively narrow edge at the distal end of end 38. By providing a force concentrating tip 40 having a comparatively small surface area the force exerted against plunger 12 is concentrated in a small area against snow, ice, debris or other build up in vessel area 16 to break up the build up and allow plunger 12 to move there through. If they debris is sufficiently broken into small pieces the debris can be moved toward and through debris clearance and liquid drain port 22.

As thus far described, the invention facilitates removal of snow, ice or other debris from vessel 16. However, some snow, ice or debris may remain for a period of time in vessel 16. If such snow, ice or debris wedges between body 32 and the inner surface walls of vessel 16, relative movement between plunger 12 and housing 14 can be restricted. To facilitate movement of plunger 12 through debris accumulated in vessel 16, a surface 42 of body 32 is provided with a plurality of relief channels 44. Relief channels 44 open from surface 42 and thereby decrease the area of closely adjacent surfaces of plunger 12 and vessel 16. Preferably, relief channels 44 decrease the area of surface 42 closely adjacent vessel 16 by at least about 25% or more.

Thus, relief channels 44 allow plunger 12 to move more easily through vessel 16 even in the presence of snow, ice or accumulated debris. Relief channels 44 further provide a plurality of pathways along plunger 12 for flow of liquids and debris around plunger 12 and through vessel 16 toward debris clearance and liquid drain port 22.

Figure 5:
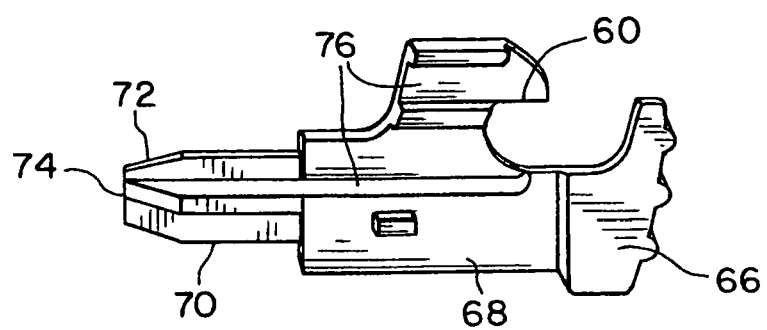
FIG. 5 is a perspective view of the plunger for the fastener shown in FIGS. 3 and 4.
Figure 3:
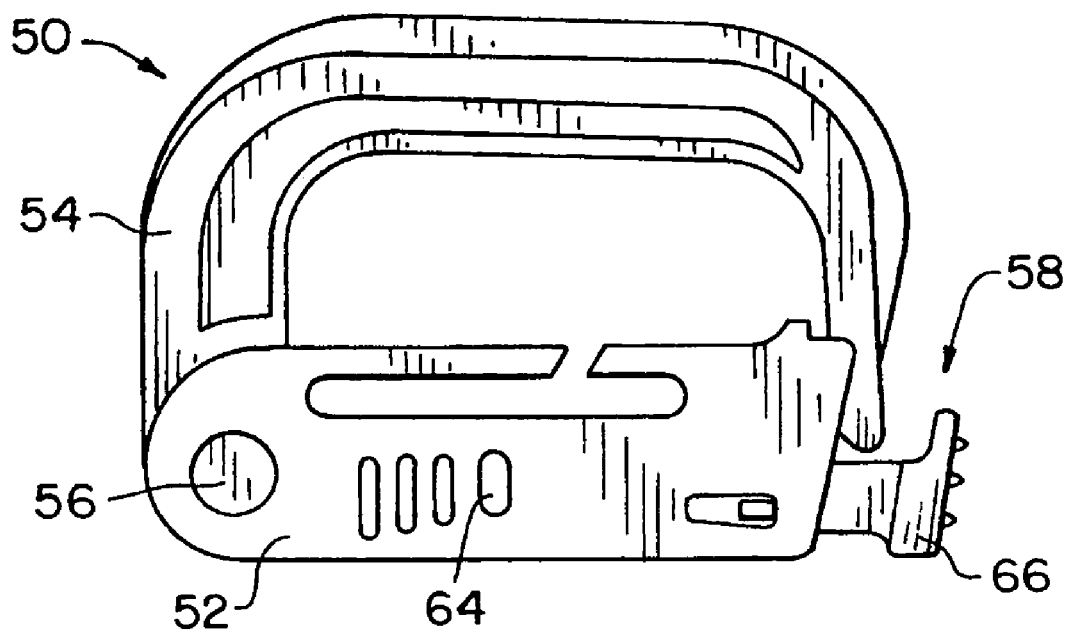
FIG. 3 is a perspective view of another type of telescoping fastener in accordance with the present invention.
Figure 4:
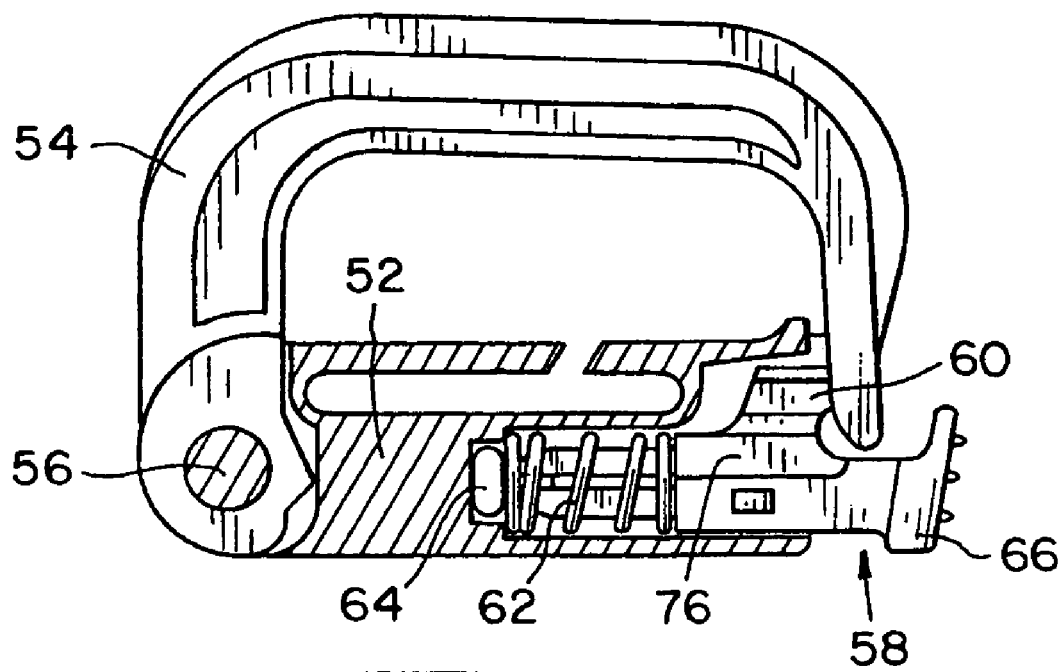
FIG. 4 is a cross-sectional view of the telescoping fastener shown in FIG. 3.

FIGS. 3, 4 and 5 illustrate another telescoping fastener 50 of the present invention having a housing 52 and a clamp 54 pivotal relative to housing 52 about an axis 56. A plunger 58 defines a latch 60 for engaging clamp 54. Plunger 58 is slidable within housing 52 and is biased towards the closed, latching position by a spring 62.

Housing 52 defines a debris clearance and liquid drain port 64 for the same purposes as described previously with respect to debris clearance and liquid drain port 22, allowing material to drain from housing 52 to an ambient environment A plurality of debris clearance and liquid drain ports 64 can be used, including ports on opposite sides of housing 52.

Plunger 58 has a top 66 and a body 68. A debris clearing extension 70 extends from body 68 toward debris clearance and liquid drain port 62. An end 72 of extension 70 defines a force concentrating tip 74 for purposes similar to those described with respect to force concentrating tip 40. In this embodiment, force concentrating tip 74 is illustrated as an elongated and relatively thin edge 74. However, a force concentrating tip such as tip 22 in the nature of a point 22 described and shown previously also can be used.

Plunger relief channels 76 are provided in the outer surface of body 68 for purposes similar to those described with respect to plunger relief channels 44 in body 32. Relief channels 76 covering at least about 25% or more of a surface area of body 68 are believed to be effective in facilitating movement of plunger 58 through accumulated debris, ice or snow in housing 52.

From the aforedescribed embodiments, it should be clear how debris clearance and liquid drain ports can be provided in otherwise enclosed areas for a variety of different types of telescoping fasteners, with plungers of the fasteners having debris removal extensions and force concentrating tips to break up and move debris, snow, ice and liquids toward the port for removal from the fastener. Relief channels along confronting surfaces in the housing and on the plunger facilitate the flow of fluids and debris toward the drain port and facilitate sliding of the plunger through debris contained in the fastener housing.

The breakup and/or removal of debris, snow or ice from a telescoping fastener facilitates operation of the fastener under adverse conditions, including continued operation under freezing conditions when water or snow are present. The present invention allows plungers to move more easily through fouled or contaminated housings, with less force being required to move the plunger. Accordingly, the potential for breaking the plunger or housing is reduced. Further, by removing water, snow and ice, corrosion type deterioration of a metal spring or other component in the telescoping fastener is reduced. The telescoping fastener dries quickly when moisture is drained therefrom, and staining from contaminated effluent is minimized.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A telescoping fastener comprising:
   a housing defining a vessel having a smooth, unobstructed interior surface;
   a plunger having a body movable in said vessel, said body substantially closing an end of said vessel to define with said housing a substantially closed vessel area, said body having a varying length in said housing upon movement of said plunger and having relief channels arranged along the direction of movement of said plunger and extending throughout the varying length of said body within said vessel to provide uninterrupted pathways between said plunger and said smooth, unobstructed interior surface of said housing;
   a port in said housing extending from an interior volume of said vessel to an ambient environment of said vessel;
   a debris removal extension projecting from said body into said substantially closed vessel area and configured for moving contaminant material in said vessel toward said port, said extension having a force concentrating tip configured for disrupting debris in said vessel; and
   the relief channels allowing unobstructed flow of liquids and debris around the plunger and through the vessel upon relative movement between the plunger and the housing.

2. The telescoping fastener of claim 1, said body having a surface area and said relief channels defined in at least about 25% or more of said surface area.

3. The telescoping fastener of claim 1, said force concentrating tip being one of a substantially rounded point and an elongated edge.

4. A telescoping fastener comprising:
   a housing defining a debris clearance and liquid drain port;
   a plunger configured to slide in said housing, said plunger including a body substantially closing an end of said housing to define with said housing a substantially closed vessel area, said body having an outer surface adjacent said housing and a varying length of said surface disposed in said housing upon relative axial movement between said housing and said plunger;
   substantially axially oriented relief channels in said outer surface of said body extending from said substantially closed vessel area and along said varying length of said body within said housing to provide uninterrupted pathways including unobstructed exit ports between said plunger and said housing to accommodate movement of said plunger through debris in said housing; and
   said channels formed in at least about 25% or more of a surface area of said body.

5. The telescoping fastener of claim 4, including an extension from said body extending toward said port.

6. The telescoping fastener of claim 5, said extension having a force concentrating tip at a distal end thereof.

7. The telescoping fastener of claim 6, said force concentrating tip being a substantially rounded point at said distal end.

8. The telescoping fastener of claim 6, said force concentrating tip being an edge at said distal end.

9. A telescoping fastener comprising:
   a housing and a plunger slidable relative to said housing, said plunger and said housing defining a substantially enclosed vessel area;
   a debris removal and drain port disposed in said housing and establishing flow communication between said vessel area and an ambient environment;
   said plunger including a body and a debris removal extension extending from said body into said vessel area and configured to move debris toward said port; and
   said plunger body defining at least one elongated, substantially axially oriented relief channel extending the varying length of said body within said housing upon relative movement between said housing and said plunger to provide an uninterrupted pathway between said plunger and said housing, for sliding past at least some debris in said vessel area such that said relief channels do not receive or accept any protruding member extending from said housing.

10. The telescoping fastener of claim 9, said extension including a force concentrating tip.

11. The telescoping fastener of claim 10, said force concentrating tip being a rounded point at a distal end of said extension.

12. The telescoping fastener of claim 10, said force concentrating tip being an elongated edge at said distal end of said extension.

13. The telescoping fastener of claim 9, said relief channels comprising at least about 25% or more of said surface.

14. The telescoping fastener of claim 13, said extension including a force concentrating tip.

* * * * *